United States Patent Office

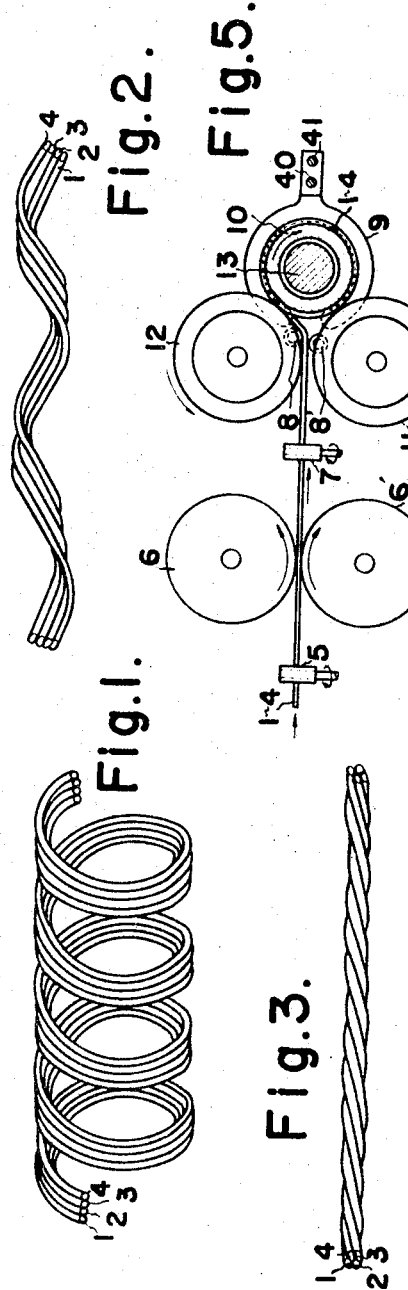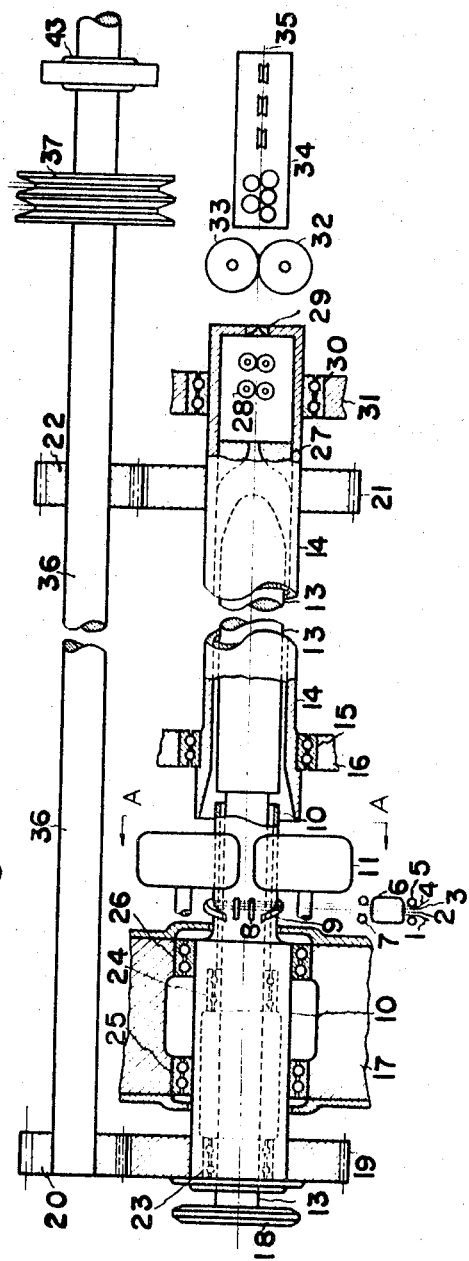

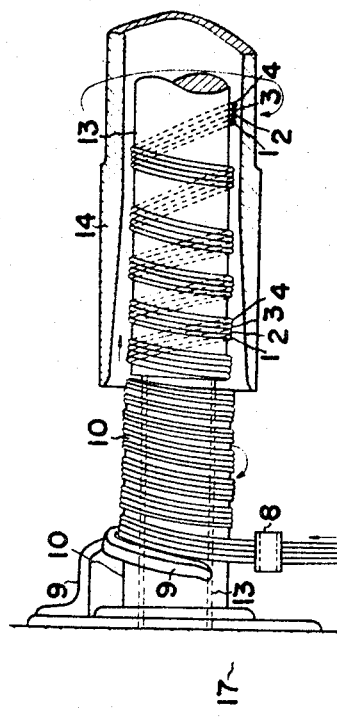
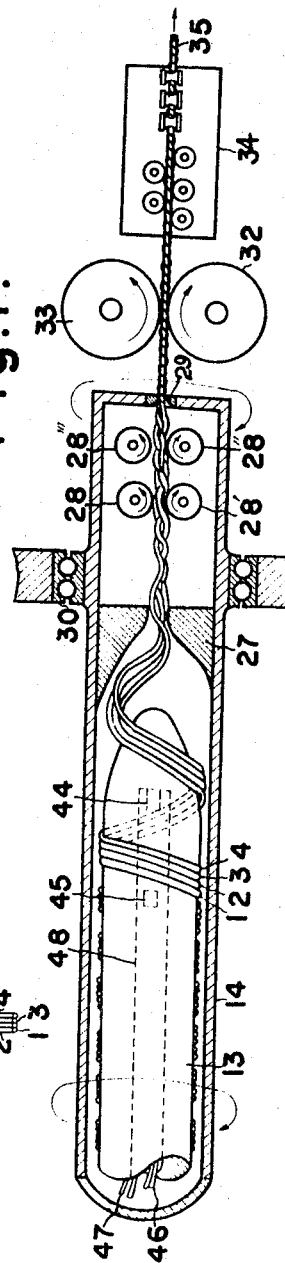
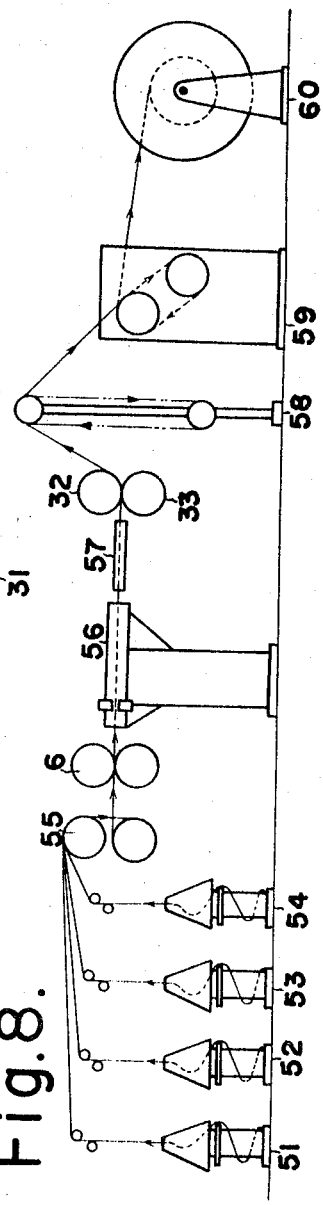

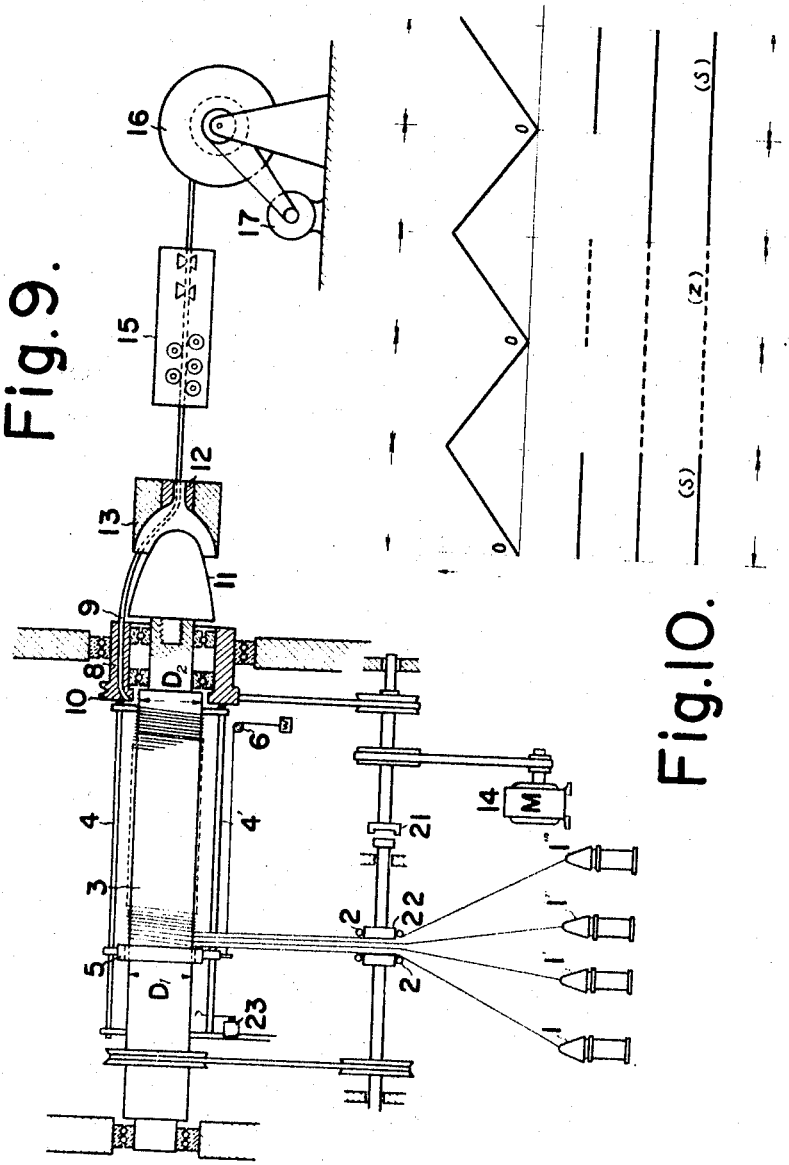

3,446,001
Patented May 27, 1969

3,446,001
METHOD OF AND APPARATUS FOR FORMING STRANDED CABLES BY HIGH SPEED TENSILE HELICOID SYSTEM
Hisateru Akachi, Yokohama, Japan, assignor to Oki Densen Kabushiki Kaisha, Kanagawa-ken, Japan
Filed Jan. 3, 1967, Ser. No. 606,788
Int. Cl. D01k 13/04; B21f 3/04, 7/00
U.S. Cl. 57—138                                6 Claims

ABSTRACT OF THE DISCLOSURE

A method and apparatus for forming a stranded cable at a high speed comprising the formation and means therefor of a helicoid of parallel component wire bands, stretching the helicoid with a predetermined tension, and further stranding the stretched helicoid so as to produce a stranded cable of considerably reduced pitch.

---

The present invention relates to a method of and apparatus for forming strands of cables by means of a high speed tensile helicoid system.

It is one object of the present invention to provide a method of and apparatus for producing stranded cables for communication use and stranded quads with high speed and efficiency.

It is another object of the present invention to provide a method for stranding core cables, such as for communication use, by producing strands in core cables during an assembling operation of cables and an apparatus for manufacturing such stranded cables at a high speed and efficiency.

It is yet another object of the present invention to provide a tensile helicoid system herein referred to, which comprises:

(a) The method for forming stranded cables by stretching helicoid coils which are formed of bands and arranged with a uniform tension by appropriate tensile force, thereby stranding the core cables of the bands;

(b) The method for forming stranded cables wherein a correcting device is provided, whereby cables that do not have complete and balanced strands as in the above-mentioned state are remedied of their undesirable characteristics, and thus complete and balanced strands or assembled cables are obtained;

(c) The method for forming stranded cables by further stranding the stretched cables in (a) under tensile force in the direction such as greatly reducing the pitch of stranding, thereby rapidly correcting the unbalances between the cables, and thus obtaining well-balanced stranded or assembled cables;

(d) Therefore, in these methods of the tensile helicoid systm applying appropriate tensile force to the helicoid band cables of (a) in combination with the methods of (b) and (c) as described producing completely stranded or assembled cables for communication use.

With the above and other objects in view which will become apparent in the following detailed description, the present invention will be clearly understood in connection with the accompanying drawings, in which:

FIGURE 1 shows a helicoid band formed of four solid wires arranged with the same tension and in parallel;

FIG. 2 shows a helicoid band in a stretched state, each solid wire of which has been applied with a uniform tension;

FIG. 3 illustrates a helicoid band which does not have the disadvantages possessed by the cable of FIG. 2, showing a completely stranded cable (a "quad" being a band with four cables stranded), showing a further stranded state of a helicoid band of FIG. 2;

FIG. 4 is an embodiment of the principal unit of a high speed cable stranding machine for embodying the method of the present invention;

FIGS. 5–7 are cross-sectional views of the principal unit of the high speed cable stranding machine along the lines A—A of FIG. 4;

FIG. 8 is a diagram showing the arrangement of the whole cable stranding apparatus;

FIG. 9 is a side elevation of the entire construction of an improved cable stranding apparatus; and FIG. 10 is a diagram illustrating the operation of the improved cable stranding apparatus.

Referring now to the drawings, and more particularly to FIGS. 1–3, the principle of the method of forming strands of cables in accordance with the present invention is disclosed. As shown in FIG. 1, component wires 1, 2, 3 and 4 are arranged in parallel, each of which forms a band arranged with uniform tension. Each band forms a complete helicoid having a precise pitch and an exact diameter. The method of formation of such a helicoid is accurately and readily achieved by winding the component wires on a mandrel which has a diameter equal to the inner diameter of the helicoid. FIG. 2 shows a condition of the helicoid band in which an adequate tensile force has been applied. This constitutes an intermediate stage of formation of a completely stranded cable. Therefore, a completed quad can be made during the secondary process of the intermediate stage by providing a stronger tensile force to the band. However, even such a process will produce an unnatural condition of the cable material and cause thinning of the core cable if the tensile force is applied beyond the limit of the intermediate stage. Adequate tensile force varies with the material, diameter, helicoid diameter and pitch of the component wires. However, when stretching a helicoid band of a diameter of 10 mm., a helicoid pitch of 5 mm. and coated with PVC up to the outer diameter of 1.1 mm., a tensile force of 5 to 10 kg. will produce the state as shown in FIG. 2.

If formation of a completed quad is desired, stretching with a tensile force of more than 20 kg. is required, but the copper cable will tend to become too thin. Therefore, the most adequate tensile force in this case is approximately 10 kg.

FIG. 3 shows a completed quad cable. In FIGS. 1, 2 and 3, the arrangement of the order of the component wires 1, 2, 3 and 4 is not changed. The figures show that the right-stranded quad (FIG. 3) is obtained from a right-wound helicoid band (FIG. 1).

The following two illustrative methods may be practiced for forming the completed quad of FIG. 3 from the intermediate stage of formation of FIG. 2.

In one method, obtaining smaller stranding pitches is accomplished, while retaining the same tensile force. For the convenience of illustration in this method, the process can be divided into two stages. In practice, if the stretching of the helicoid band by a tensile force and the further application of stranding thereof are simultaneously performed, a satisfactory sliding and movement between the component wires may be achieved as desired, and a complete guad can be obtained by formation in a single operation.

The second method includes a process in which the component wires are applied with a predetermined tensile force in the state shown in FIG. 2 and are sent to a correction device for leveling off the surfaces thereof by sliding the component wires between each other. As a consequence, the component wires automatically move into positions of minimum distance between one another, thereby arranging themselves into a completed quad.

By experiment, it has been found that this object has been achieved by leveling the surfaces with soft rubber rollers under constant tension, and without applying a correction device. For attaining the object at high speeds, however, the use of a correction device was found more dependable. Still preferable is the employment of the above described two methods in combination for a practical and high speed operation in order to get a quad having completed characteristics; that is, the application of a definite and adequate tensile force to the helicoid band and simultaneously providing strands thereto in the direction of greatly reducing the stranding pitches, and also applying a leveling and smoothing operation thereto by a correction device.

The above method has been described by one example of a quad (four strands). Also, the same principle will apply to cases of formation of two or three strands, but such is more easily done. In this case, the tensile force which is required for stretching work is between ½ and ⅓ and the leveling operation by the correction device can be eliminated. Furthermore, this method can eliminate an apparent eccentricity of an insulator for the component wires when back stranding is required for the cables, in the event of formation of stranded cables or for improvement of the electric balance of the communication cable quads or for attaining the same result uniformly as non-eccentric component wires in case stranding is made on the component wires (single core wires) as required, in which case quite the same principle may be simply and securely applied to the stranding.

The stranding method according to this principle may be used for assembling communication cables by the combined use of a vibrating strap and a tap winding thread from previous cables of a circular shape, by which it is possible to assemble a few strands at a high speed.

Referring now again to the drawings, and more particularly to FIGS. 4–7, the principal unit of the cable stranding machine which incorporates a tensile helicoid system comprises three elements: a mandrel 10 for producing a base for the helicoid band during the high speed rotation; an inner torpedo 13 which is neutral in position, or free of rotation; and a revolving torpedo 14 which lies outside of and surrounds the mandrel 10 and the inner torpedo 13, and is driven in the same direction and at the same speed as the mandrel 10. There are provided, in addition, a fixed guide plate 9, hard rubber press rolls 11 and 12, and guide wheels 8 and 8' for the cables. A nozzle 27 is provided adjacent the outlet of the inner part of the revolving torpedo, and dies 29 at the outlet. Rubber tires 28, 28' and 28" press the cables between the nozzle 27 and the dies 29.

The component wires 1, 2, 3 and 4 to be stranded into a communication cable quad are brought forward at a uniform and definite tensile force from a delivery device.

Cable guides 5 and 7 arrange the wires closely to each other. A scaling machine 6 is disposed for sending out reverse revolution signals of the stranding machine mandrel 10 and the revolving torpedo 14. An electromagnetic brake 43, a reversible motor 39 and V-pulleys 37 and 38, respectively, carry out alternate and repeated operations of a sudden normal revolution, a sudden stop, and a sudden reverse revolution, according to the signals sent out from the scaling machine 6.

The guide wheels 8 and 8' guide each wire to the mandrel 10 so as to wind the wires therein closely thereon. As shown in FIG. 5, the cable contacts the guide wheel 8, but in case of reverse revolution of the apparatus it contacts the guide wheel 8' and is wound in the reverse direction. The component wire guide 9 is rigidly fixed on the frame 17, defining a fixed angle therewith in the advancing direction of the component wires. There is provided a space of 0.1 mm. to 0.2 mm. therebetween for preventing interference with the revolution of the mandrel. The guide plate 9 turns the direction of movement of the group of component wires coming straight or forward relative to the axis of the mandrel, and pushes (to the right) the group of component wires which are wound at the tip end while advancing forward along the guide plate. The operation of the guide plate 9 covers the distance to the side opposite to the incoming side of the group and the other half side is covered by a similar operation in the case of reverse revolution.

The guide plate 9 and the cable material are required to smoothly slide, so that wear proof material, such as hard chromic plating or ceramic coating, may be employed for the side surfaces of the guide plate. In order to provide a better sliding and wear proof characteristics to the materials, ultrasonic vibrations may be imparted to the guide plate by a miniature ultrasonic oscillator for achieving an efficient result.

The hard rubber press rolls 11 and 12 prevent sliding between the cable material and the surface of the mandrel for securely winding off the solid wire material and for delivery of the helicoid band on the mandrel into the revolving torpedo. The closely adjacent position of the rolls 11 and 12 and their contact with each other on the mandrel 10 insure the catching of the bending of the band during the reverse revolution of the mandrel and assist the formation of the reversely directed helicoid band. The outer diameter of the mandrel 10 is the same over the length of, for example, 10 mm. from the side surface of the cable guide plate 9 and further, near its tip end, tapers to a point so small as to be indistinguishable to the naked eye. This is provided for facilitating lateral sliding of the cable material.

The mandrel 10 is fixed rigidly on the frame 17, free of rotation by means of ball bearings 25 and 26 and is enabled to revolve more than 3,000 r.p.m. through gears 19 and 20 and a transmission shaft 36. The mandrel is hollowed and supports the inner torpedo 13 through ball bearings 23 and 24 housed in the base part of the mandrel 13 and is capable of resting or revolving independently of the mandrel.

The inner torpedo 13, having a space 2.5 to 3 times the diameter of a component wire, with the inner diameter of the revolving torpedo 14 stands in a neutral position in a concentric circle. The revolving torpedo 14 is rotatably mounted on the frames 16 and 31, respectively, through ball bearings 15 and 30 which, through gears 21 and 22 and the transmission shaft 36, rotates in the same direction and at the same speed as the mandrel 10. The shaft 36 is rotated through V-pulleys 37 and 38 by a motor 39, normally or reversely, for every predetermined length in response to signals of the scaling machine 6. Reduction of the revolving speed of the shaft is controlled to be extremely short by means of a sudden stop electromagnetic brake 43 in order to save its changeover time. One end 14' of the torpedo 14 is located at a position so that the tip end portion of the mandrel 10 is covered thereby. In that position, the inner diameter of the mandrel is larger as shown in order to easily receive the band therein. The nozzle 27 acts as an intermediate cable forming nozzle for stretching the helicoid band in a uniform manner, and the bore diameter of which is about two times the stranded outer diameter of a quad after formation. The nozzle 27 is highly effective in maintaining adequate back tension during the stretching operation of the cable.

The rubber tires 28, 28', 28" and 28'" for pressing cables operate in the following three ways. First, they level off the pitches of the intermediate stranded wires evenly or prevent a delinquent strand. Secondly, or in a subsequent stage, they will retain a predetermined tension during the passage of the cables through the forming dies 29 and prevent oscillation of the cables. Thirdly, they insure correct stranding when the cables are given a reverse strand during the passage between the intermediate forming dies 29 and the press rolls 32 and 33 in the direction such that the pitches of the stranded wires may be reduced even to half the normal value. They also prevent the destruction of strands and avoid irregularities of the pitches which may arise when the effect of reverse revolution is brought into the torpedo 14.

The press rolls 32 and 33 are provided behind the principal unit of the cable stranding machine to act for both a receiving wheel and a scaling machine. These rolls revolve at speeds exactly synchronous with the scaling machine and receive the cables from the dies 29 at the tip of the revolving torpedo, precisely for the length which they are delivered from the scaling machine 6 to the mandrel 10. By stopping the revolution of the stranded wires along the axial and right-angled direction of the torpedo, the rolls can assure the strand on the cables between the dies 29 and the press rolls 32 and 33 while the torpedo continues to revolve. The cable material may be advanced forward and straight, or it may be wound on the rolls to secure the receiving power of the rolls.

The motor for synchronizing the revolving speed of the press rolls 32 and 33 with the scaling machine 6 is not shown, but a motor of constant torque and variable speed, such as a VS motor, is most suitable. With a constant torque motor, only the band which moves through the revolving torpedo and is released at the tip end of the inner torpedo is stretched out, so that the revolving speed of the press rolls 32 and 33 naturally synchronizes with the speed of the scaling machine 6. But, with the wires in which the insulating material is small in coefficient of friction, the cables tend to be stretched out at a higher speed than that of the scaling machine because the force of the scaling machine yields to the force of a torque motor (such as a VS motor of constant torque and variable speeds) for driving press rolls, whereupon the cables will have larger pitches than desired. In this case, the speed of a variable speed motor may be controlled by speed adjusting switches that can regulate the stored amount of the bands in the revolving torpedo.

In FIG. 7, an opening 48 is provided in the inner torpedo, which runs through to the rear part of the inner torpedo. A speed acceleration switch 44, a speed reduction switch 45, and lead wires 46 and 47 for those switches are provided, which wires pass through a push ring from behind the cable stranding machine through an opening 48 in the inner torpedo, and then are connected to a speed regulating board of the variable speed motor for driving the press rolls 32 and 33. Now, if the receiving speed of the press rolls is lower than the scaling machine 6, the amount of stored bands in the torpedo will gradually increase and, eventually, the bands will push the speed acceleration switch. The press rolls will increase in speed and, in turn, the amount of stored bands decreases, and finally the band will leave the speed reduction switch. If the speed reduction switch is provided to operate when it leaves the band, the drawing speed of the press rolls will decrease again, i.e., the amount of stored bands will increase or decrease slowly between the speed acceleration switch 44 and the speed reduction switch 45. Acceleration for the increase or decrease of speed may preferably be small for the prevention of hunting.

The correction machine 34 is provided with five vertical rolls and five lateral rolls to level off the uneven parts of the stranded wires passing through between the rolls and to flatten the surfaces thereof. Depending on the quality of the wires, either the press rolls or the correction machine may be omitted in use.

After passing through the press rolls, each wire is stranded uniformly with a predetermined pitch and formed into an almost complete quad for a communication cable. By passing it through the correction machine, it is possible to obtain a more complete stranded cable quad, as desired. Arrangement of the component wires in the order of component wires 1, 2, 3 and 4 may always be secured for the wires in a fine way.

A description will now be provided for the interrelationship among the three components of the cable stranding machine.

The helicoid band which is formed on the mandrel 10 is pushed into the inner part of the revolving torpedo 14 one after another. Since the space between the two torpedoes 13 and 14 is small, the arrangement of the order of component wires is not destroyed. The revolving torpedo 14 and the mandrel 10 revolve in the same direction and therefore act in the direction so as to reduce the diameter of the band. Consequently, the component wires are not packed between both torpedoes, disturbing their advance. The inner torpedo 13, when it is resting by action of the brake 18, operates like a conveyor for advancing the band forward within the torpedoes since the stranding direction of the cable produces a screwing action due to the friction of the band. Therefore it conveys the bands from the mandrel 10 to the torpedo in succession. The inner torpedo has its tip end formed in a torpedo-shape and the band carried thereover changes its shape from a helicoid to a helicoidal shape at this juncture. The stretching speed at this moment is equal to that of the winding of the band on the mandrel and also to that of delivering it from the tip end of the mandrel into the torpedo 14. When the drawing speed is higher than the above mentioned speed, the band winds on the inner torpedo due to the friction resistance itself, becomes fixed thereon and, as a consequence, the band is not freely drawn out. The press rolls 32 and 33 reduce their speed due to the resistance of the band and eventually the winding-up speed of the band by the mandrel, i.e., the speed of the scaling machine 6, will become equal thereto.

As hereinbefore mentioned, the drawing speed can be automatically controlled by speed acceleration or reduction switches depending upon the quality of the component wires.

When a helicoid band of a predetermined stored length is formed on the revolving torpedo, it is possible to be drawn from the torpedo by stretching it by constant tension and stranding it in the direction so as to reduce the pitches of its component wires while stretching it. In this case, the mandrel and the revolving torpedo must be turned in reverse, otherwise the object will not be attained as desired. That is, the helical direction of the helicoid band thus formed may be inverted for every definite length. The quad formed by drawing the band may alternately be stranded either in the right or left direction for every definite length as determined by the capacity of the revolving torpedo.

During the reverse revolution of the torpedo, the band has an opposite position compared with the normal revolution. In this case, friction between the band and the inner wall of the revolving torpedo 14 acts in the direction so as to increase the diameter of a helicoid, and the frictional relation of the inner torpedo 13 and the band will act in the direction so as to separate from each other and also in the direction for turning the band rearwardly. This tendency is rather convenient for drawing out the band, because, as prepared for being drawn out, the band is increased in diameter, separates from the fixed or revolving inner torpedo with a resistance, and is securely attached to the inner wall of the torpedo while providing an adequate back tension.

Thus it is apparent that the relative operation of the mandrel, revolving torpedo and inner torpedo is primarily adapted to form stranded cables according to a novel method of the present invention, as described in FIGS. 1, 2 and 3.

Referring now once again to the drawings, and more particularly to FIG. 8, the cable stranding machine comprises a delivery means 51, 52, 53 and 54 of component wires of a common flyer payoff type. Drums are disposed vertically and the component wires are drawn upwardly therefrom through a conical guide, which wires are then delivered in rotation by centrifugal force. The inner surface of the cone from which the wires are delivered defines the diameter of the wire in rotation, preventing the wires from intensely contacting the flange of the drum. Above the flange a plate is provided having plastic hairs in great numbers therearound. The hairs operate to break the wires and prevent the component wires from excessive delivery. A back tension means 55 includes wheels which are provided to give a tension force always in the reverse direction against the advance of the component wires by reverse revolution of the torque motor. By this action, the component wire is wound on the mandrel 10 provided in the body 56 of the cable stranding machine with certainty and strength.

The component wires 1, 2, 3 and 4, leaving the delivery means 51, 52, 53 and 54, are imparted sufficient reverse tension by means of the back tension device 55 and enter the principal unit 56 of the cable stranding machine through the scaling machine 6.

When a certain length of helicoid band is formed in the principal unit of the cable stranding machine, the mandrel and the revolving torpedo of the machine stop suddenly and then start to revolve in the reverse direction by means of a signal of the scaling machine. At this moment, if any slackening or entanglement may be produced or a reverse tension be cancelled due to inertia, the formation of the helicoid band after reverse revolution will become incomplete.

Therefore, the flyer payoff system as shown in the drawing may be most suitable for delivery of the wires. In this case, the force of inertia is produced only by the centrifugal force of the wire of a certain length so that the hairs in the delivery means suffice to serve for the braking operation. The back tension means 55 is driven by the torque motor of a reverse revolution, which will not make an over-revolution by inertia. Even when slackening is produced between the back tension means 55 and the principal unit 56 of the cable stranding machine due to a sudden stop, the means promptly revolves in the reverse direction and cancels the slackening. The scaling machine 6 is adapted to compare and measure the length of a wire delivered into the cable stranding machine 56 and to send signals of a sudden stop or reverse revolution to the transmission system of the principal unit of the cable stranding machine for every predetermined length of the cable. The synchronous operation of the press rolls 32 and 33, and their drawing speed in relation with the scaling machine 6 has hereinbefore been described.

The cable stranding machine runs at high speeds such as several hundred meters per minute and repeats the sudden stop and reverse revolution for every predetermined length of a wire, so that it is almost impossible to change the speed of the receiving wheel 59 and the winding device 60 in response to the speed of the wires. Also, it is very difficult to have the length of a wire wound on the mandrel 10 and the length of a cable received by the receiving wheel 59 and winding device 60 to be in complete agreement. Therefore, it is sufficiently adequate to provide the receiving speed of the receiving wheel 59 and the winding device 60 at a constant speed and synchronize the speed of the principal unit 56 of the cable stranding machine with the receiving speed. To fulfill this requirement, there is provided a cable storing machine 58 between the principal unit of the cable stranding machine and the receiving wheel.

The cable storing machine consists of about ten fixed grooved pulleys in a unit, each being free of rotation, and about ten dancer pulleys, each being rotatable and movable upwardly and downwardly. The stranded cable as shown is hung on the dancer pulleys whereby, when the speed of the entire cable stranding machine exceeds that of the receiving wheel, the dancer pulleys will come down, and when the former does not, the latter will go up. The motor speed of the principal unit of the cable stranding machine may be slowed down when the dancer pulleys stay at the lower position, and it may be accelerated when they are at the upper positions. At the intermediate positions of the pulleys, the speed may be distributed in proportion to the positions so that a balance will be established at a point where the dancer pulleys are compatible with the speed of the receiving wheel, and the cable stranding machine will be stable with a revolving speed corresponding to the position of the dancer pulleys.

An instantaneous heating means 57 is provided for instantly heating and melting only the surface of the part for changing the stranding direction to prevent back stranding of the cable. Results of experiments are that PVC cables each of 0.5 mm. conductor having a finish diameter of 1.1 mm. were stranded in a quad in pitches of 50 mm., were not back-stranded against the tensile force of 5 kg. when not instantaneously heated, and were not backstranded again at 10 kg. when the surfaces were heat melted.

Effects and features of the high speed cable stranding apparatus according to the present invention are as follows:

(a) A band with the component wires completely arranged, is wound on the mandrel, each wire being of the same length. Accordingly, the obtained stranded cable will not have a "partial stranding" as with the conventional stranded cables, obtaining finished cables of excellent electric properties. With the conventional cable stranding machines, partially stranded portions must be cut off in order to arrange all cables in a line which has been shortened, which causes a considerable loss of cable. This defect is eliminated with the present invention.

(b) The speed of production of stranded cables by the cable stranding machine may be obtained by multiplying the stranding pitches by the number of revolutions. Therefore, the speed can be obtained by comparison with the actual number of revolutions. With the exception of some cable stranding machines of the bobbin-swing type such as having large rolls and a great moment of inertia, the cylindrical cable stranding machines for local and city communication use have ordinarily 500–1,000 r.p.m. (diameter of a revolving drum is 450–600 mm.) and, in case of a double stranding machine, 1,000–2,000 r.p.m. (the revolving diameter of the revolving flyer is 500–700 mm.), while the SZ-cable stranding machine has 250–700 r.p.m. (the diameter of a revolving cable storing machine is 200–250 mm.). In comparison with these, the cable stranding machine of the present invention has a required pitch of 50 mm. and is of the double stranding type; therefore the initial stranding pitch is 100 mm. Since a pitch of the helicoid band is 4 mm., a helicoid diameter (from center to center of the component wires) $D'$ is as follows:

$$D' = \frac{\sqrt{100^2 - 4^2}}{\pi} = 31.8 \text{ mm.}$$

As the outer diameter of the component wire is 1.1 mm. and the outer diameter of the mandrel is 30.7 mm., the outer diameter of the inner torpedo is 30 mm. The inner diameter of the revolving torpedo is 35 mm. and the length of the helicoid band is 1.5 m. Therefore, the length of the stored band is 34 m. in the case of four strands; 45 m. in the case of three strands; 68 m. in the case of two strands; and 136 m. in the case of a single core (strand).

The mandrel, torpedo, and also the cable material, except only four pieces of rubber tires for pressing (which are small in size) revolve together so that the machine according to the present invention is extremely well balanced. Rubber tires for pressing are small in size, and therefore the cable stranding machine of the present invention can readily attain 3,000 r.p.m. and more up to 4,000–5,000 r.p.m. after complete balance has been gained. In addition, the cable stranding machine of the present invention is of the double stranding type which has equal revolutions of 8,000–10,000 r.p.m. With a synchronous normal or reverse revolution as required, the machine actually may have 3,000 r.p.m. (equivalent to 6,000 r.p.m.) and an average capacity of 5,000 r.p.m., from which it follows that the output of a four-strand cable will be 50 mm. x 5,000 or 250 m. per minute.

(c) The possibility of a connection with preceding processes by the high speed operation is another feature of the present invention. That is, the machine can be connected with certain units of plastic extruding machines, which makes it possible to obtain the stranded cables and quad stranded cables through one process. Likewise, with this machine it is possible to operate in one process with the extruding machine, the cable stranding machine, and the cable assembling stranding machine or, in association with a sheath extruding machine, for establishing a complete process of manufacture of communication cables.

(d) The ready multiplication of the principal unit of the cable stranding machines for a high speed stranding process is another feature of the present invention. As the principal unit of the cable stranding machine is small in size, since it has a diameter of about 50 mm. and a length of about 1.5 mm., the multiplication is much easier than that of the conventional SZ system. For instance, the machine can readily form even a five quad assembly in one process in association with the process which can produce component wires of ten pieces at one time at a speed of 200 mm.–300 mm. per minute from a baking and foaming furnace as for the CCP city cables. In this case, as hereinbefore described, such a five quad assembling can readily be made also at a high speed by the stranding system of the present invention. Parallel use of a number of the same single process apparatus, and also single processing, including a subsequent assembling unit, are also available. Thus it is possible in this system to employ a cable stranding machine providing even ten or twenty principal units in one system, which is another feature of the cable stranding machine of the present invention.

(e) The correction for slag is readily assured with the cable manufactured by the machine of the present invention. Upon the formation of the stranded cables in accordance with the machine, as shown in FIG. 4, assuming that the pressure of the rubber rolls 28, 28', etc., used for pressing cable, is reduced to its minimum pressure, while the bore diameter is made larger by 2–2.5 times as much as the outer diameter of the cable so that the cable is extended and pulled out only by the press roll 33 without the correction machine 34, the obtained stranded cable or quad may have desired pitches or spirals as shown in FIG. 2, and the cable assembled from such strands with the small tensile force will have good correction characteristics for slag as described. This correction characteristic for slag will be effective in taking a core strand out of a sheath of a spanned outdoor mining cable.

(f) According to the present invention, pasting is not required at the changing point of the stranding direction, because this point is once deflected with certainty on the mandrel; and the stranding pitches are retained with high precision and do not become coarser at the point of change of direction; and for safety, the cable is fused at the surface by instantaneous heating some time during the course of running from the torpedo to the press rolls 32 and 33.

(g) The other feature of this manufacturing apparatus is that a component wire delivery drum and a taking-up drum can be made large as required (which serves to promote working efficiency of the machine and reduction of the number of operators).

An illustration will further be made with reference to an embodiment shown in FIGS. 9 and 10, in which a band is closely wound on a high speed revolving mandrel which has a diameter of $$\frac{\text{Stranding pitch } P}{\pi} - d = D$$

(where $d$ is the outer diameter of an element wire). The band on the mandrel is drawn with the mandrel slightly tapered, and then the band is delivered by the delivery ring which slides toward the outlet and is drawn out through the correction machine to provide a stranded cable. In the embodiment shown in FIG. 9, delivery means 1, 1', 1", etc. for the wires of the flyer payoff type are provided for the prevention of excessive delivery due to inertia. A back tension device 2 in which grooved pulleys pass the wires, applies a tension force in the reverse direction against the progress of the component wires through reverse revolutions of the torque motor, whereby the wires are wound on the mandrel with good force. The mandrel 3 has at least some gradient; its diameters are $D_1$ and $D_2$, of which $D_1 > D_2$, and the difference thereof is less than about ½ of the outer diameter of a component wire. A slidable ring 5 is provided for pushing the wound band always to the right, as well as its guides 4 and 4', a pulley 6 and a weight W. A rotor 8 for pulling the band is driven for rotation in the same direction as the mandrel 3. Its rotation speed is lower than that of the mandrel 3, which is ½ thereof. An outlet path 9 of a stranded cable is approximately parallel with the axial direction of the mandrel. A drive pulley 10 is provided, a curved guide face 11 is fixed on the mandrel 3. Fixed dies 13 are located fixedly in the center of a stationary guide cylinder 13. A correction machine 15 is provided for adjusting the stranded outer diameters by uniformly leveling off the protrusions or slag of the component wires by means of a number of opposite rolls. A winding device 16 is attached with a torque motor 17 for winding up the stranded cable with a fixed tension. The drive motor 14 and an electromagnetic clutch 12 with controller drives or suspends rotation of the mandrel 3. A limit switch 23 is operated by a slidable ring 5.

With the construction described above, the stranded cable forming apparatus will make a cycle of four operations as hereinafter described while retaining a uniform velocity continuously for obtaining the object.

In the first operation, the mandrel 3 makes right revolutions, as for example at 3,000 r.p.m. (hereinafter the direction of revolution is shown as viewed from the right side of the rotary body for stranding), and the stranding rotary body revolves in the same direction (i.e., a right revolution) at 1,500 r.p.m., whereupon the component wire is wound on the mandrel at a speed of $\pi D \times 3,000$ mm./min. and drawn out through the revolving body for stranding at a speed of $\pi D \times 1,500$ mm./min. with a constant tensile force by a winding machine 16, thereby forming the stranded cable. As a consequence, the stranded cable is right-stranded. However, D is a mean diameter of the mandrel $(D_1+D_2)/2$, which is independent of the radius of revolution of the cable path of the stranding rotary body. The length corresponding to the difference of $\pi D \times 1,500$ mm./min. is stored on the mandrel, whereupon the position of the winding-up of the band shifts from the right to the left. However, the band is pressed against the stranding rotary body continuously by the pressing action due to the tapering, $D_1-D_2$, of the mandrel and the slidable ring 5. As the amount of the stored band increases, however, the slidable ring is gradually pushed to the left.

In the second operation, when the mandrel reaches a predetermined r.p.m., it stops by action of the electromagnetic switch and the brake.

Now, assuming that a mean diameter of the mandrel is $D=25$ mm.; the effective length of the mandrel is 1 m.; the diameter of a component wire is 1 mm.; and with four strands to be formed, $$1,000 \div (1 \times 4) = 250$$

$$250/1,500/60 = 10 \text{ seconds}$$

and $$25 \times \pi \times 250 = 6,250 \text{ mm.}$$

When a component wire of 6,250 mm. is stored, the mandrel stops, and at the same time the stranding rotary body revolves in reverse (to the left) by reverse revolution of the principal motor 14. The band is then drawn by the tensile force of the winding machine and will form a left hand stranding Z. The slidable ring 5 strands the rest of the band, pressing it to the revolving body, and moves to the right.

In the third operation, when the storage of the band on the mandrel is completed, the mandrel starts to revolve to the left at a speed of 3,000 r.p.m. The stranding rotary body continues to the left at revolutions of a speed of 1,500 r.p.m. The left-hand stranded cable is thus wound up by the winding machine and a band of $6,250\pi$ mm. in length is stored on the mandrel.

After the storage has been accomplished, the fourth operation is started. Then the mandrel ceases its movement and the stranding rotary body 8 changes revolving to the right and continues to revolve at the speed of 1,500 r.p.m. making 250 revolutions. Therefore, the time is $$250 \div (1,500/60) = 10 \text{ seconds}$$

During this time, the storage of the bands is gradually reduced. By the winding machine, the right-stranded cable S is wound up by $6,250\pi$ mm. and when the storage of the bands has finished, the operation turns to the first stage after a complete cycle of the operation is completed. Then the mandrel starts to move and revolve at 3,000 r.p.m. in the right direction. The stranding rotary body still continues to turn in the same direction.

The operations through the above four stages are shown in FIG. 5. The results obtained from these operations are briefly: the continued time of operation in each stage is 10 seconds; the forming speed of the stranded cable is $$25 \times \pi \times (1,500/60) = 625 \text{ mm./sec.}$$

at a continuous and constant speed; the length of change of the stranding direction is $6,250\pi \times 2$ mm.; and the stranding pitch is 25 mm.

The invention, having a construction as described hereinbefore, includes the following features and advantages:

(1) The diameter of the rotary body is less than one tenth of that of the conventional stranding apparatus, and thereby a high speed revolution can be effected; (2) for the same reason, the wear of the machines is very small and the operational life is relatively long; (3) the operation can be performed very quietly without a noisy operation as with conventional stranding apparatus; (4) no strong centrifugal force is applied on the material cable, causing effects such as thinning of the cable diameter, consequently producing a high quality product with a remarkably low percentage of loss; (5) the mandrel for forming the helicoid serves as a receiving device in the conventional stranding apparatus, so that the apparatus of the present invention does not require a receiving device of the usual construction, and thereby the machine is simplified in construction and its cost is reduced; (6) because of the tensile helicoid system, it does not cause irregularities in the stranding pitch and no partial stranding as with conventional stranding apparatus, so that, as in (4) above, the quality of the product is greatly improved and the loss is greatly reduced in amount; (7) the apparatus of the present invention is available in a very small size, so that a number of such apparatus can be assembled in one unit and can be simultaneously operated in combination with other stranding apparatus in subsequent stages; (8) the apparatus does not need a scaling mechanism as attached to the conventional SZ stranding apparatus, nor a connection and synchronization apparatus for reverse revolution, whereby the machine is capable of simplification and reduced cost.

The method and apparatus described above are the most simplified embodiments of the present invention, but variout changes, additions, omissions and modifications, as follows, may be made without departing from the spirit, scope and principles of the present invention; that is, (1) The complexity of the apparatus;

(2) A difference of stranded pitch in consequence of either right strand or left strand;

(3) Taking no account of the excess stress applied to the solid wires in consequence of the variance of the sliding characteristics, under two conditions that (a) the speed of revolution of the mandrel must always be faster than that of the stranding revolving body at the period of the first operation and the third operation, and (b) the direction of revolution of the stranding revolving body of the period of the second and fourth operation must always be reverse to the direction of revolution thereof at the period of the first and third operation, the present invention can be embodied in the same way as the described embodiment by means of combination of the speed and the direction of revolution of the mandrel and the stranding revolving body, in such manner that the number of right-stranding revolutions and that of the left-stranding revolutions can be squared at the period between the first operation and the fourth operation.

It will also be understood that the method and apparatus according to the preferred embodiment described is also effected through the repetition of only the first and second operation or through the repetition of only the third and fourth operation, but in these cases the number of the changing point of the stranding direction increases.

It will also be noted that a tapered tip end of the mandrel can be eliminated when working solid wires with lesser frictional resistance.

It will be understood that the method and apparatus as described above are equally effective in any case in an improvement of quality of the communication cable, a lowering of loss ratio, and elevation of efficiency, as well as a lowering of depreciation of the cost of equipment.

What I claim is:

1. A method of forming a stranded cable at a high speed, comprising the steps of
   uniformly arranging a group of parallel component wire bands in the form of a helicoid,
   stretching said helicoid of wire bands with a predetermined tension, and
   further stretching the stretched helicoid of wire bands, thereby stranding it so as to produce a stranded cable of much smaller pitches.

2. A method of forming a stranded cable at a high speed, comprising the steps of
   uniformly arranging a group of parallel component wire bands in the form of a helicoid,
   stretching said helicoid of wire bands with a predetermined tension, further stretching the stretched helicoid of wire bands, thereby stranding it so as to produce a stranded cable of much smaller stranding pitches, and
   uniformly leveling off the produced strands to smoothen the stranded surfaces of the cable.

3. A method of forming a stranded cable at a high speed, comprising the steps of
   producing a helicoidal element wire band by winding a group of component wire bands in parallel arrangement on a mandrel at a high speed by a predetermined tension, and
   drawing out said band from a stranding rotary body revolving on the outer periphery of one end of the mandrel at a different speed of rotation than that of the mandrel, whereby due to the difference of speeds of revolutions between the speed of revolution of the mandrel and that of the stranding revolving body, which includes normal and reverse revolutions, a helicoidal cable band is drawn out and stretched as desired, thereby continuously forming a SZ stranded cable.

4. An apparatus for forming a stranded cable from a plurality of component wires at a high speed, comprising
   a mandrel having a length capable of winding in parallel the component wires thereon during revolution at a high speed and for storing them temporarily therein, a stranding rotary body means for repeating normal and reverse revolutions alternately at a revolving speed of approximately one half of the speed of said mandrel and disposed rotatably along the outer periphery of one end of said mandrel, a slidable ring which slides along the outer peripheral surface of the mandrel pushing the helicoid wire band wound on the mandrel to the side of said stranding rotary body means, said mandrel is driven in sequence in the order of normal revolution, stopping, reverse revolution, stopping, and normal revolution, and a driving mechanism means for making the direction of revolution of said mandrel to accord with that of said stranding rotary body means.

5. A method for forming a stranded cable at a high speed, comprising the steps of forming a helicoidal element wire band of a plurality of uniformly arranged component wires on a mandrel continuously by revolving the mandrel, introducing said helicoidal element wire band into the inner part of a revolving torpedo revolving at the same speed and in the same direction as the mandrel, and stretching and drawing out said helicoidal band from said torpedo by a predetermined length by a predetermined tension by rotating in reverse said mandrel and said revolving torpedo, thereby forming a stranded cable.

6. A method for forming predetermined lengths of a stranded cable at a high speed with an inner torpedo concentrically disposed and independently free for rotation or resting relative a mandrel and concentric with the mandrel within a revolving outer torpedo, comprising the steps of forming a helicoid wire band from a plurality of component wires by winding the component wires in parallel along the mandrel, stored in the space between the revolving outer torpedo and the inner torpedo, and drawing said helicoid wire band axially out of the torpedoes by revolving the mandrel and the revolving outer torpedo in reverse for every predetermined length of said helicoid wire band, stretching and thereby forming said stranded cable.

References Cited

UNITED STATES PATENTS

| | | | |
|---|---|---|---|
| 2,280,188 | 4/1942 | Downing | 57—138 XR |
| 2,540,833 | 2/1951 | Pitt et al. | 57—138 XR |
| 3,134,216 | 5/1964 | Smith | 57—138 XR |
| 3,285,528 | 11/1966 | Beindorf | 57—138 XR |
| 825,249 | 7/1906 | Stevens | 72—142 |
| 1,788,641 | 1/1931 | Sunderland | 57—138 XR |
| 2,105,338 | 1/1938 | Sunderland | 57—138 XR |
| 2,363,826 | 11/1944 | Yellin | 72—142 XR |
| 2,980,959 | 4/1961 | Genovese. | |
| 3,000,427 | 9/1961 | Gogan | 72—142 XR |
| 3,005,304 | 10/1961 | Holm | 57—60 XR |
| 3,039,259 | 6/1962 | Lenoble | 57—34 |
| 3,071,917 | 1/1963 | Fisher | 57—34 XR |
| 3,342,026 | 9/1967 | Nichols et al. | 57—138 XR |
| 3,359,768 | 12/1967 | Platt | 72—142 |

DONALD E. WATKINS, *Primary Examiner.*

U.S. Cl. X.R.

72—142